United States Patent
Ortner et al.

(10) Patent No.: US 12,297,137 B2
(45) Date of Patent: May 13, 2025

(54) STRUCTURED PLATE-LIKE GLASS ELEMENT AND PROCESS FOR THE PRODUCTION THEREOF

(71) Applicant: Schott AG, Mainz (DE)

(72) Inventors: Andreas Ortner, Gau-Algesheim (DE); Andreas Roters, Mainz (DE); Frank-Thomas Lentes, Bingen (DE); Lutz Parthier, Kleinmachnow (DE); Markus Heiss-Chouquet, Bischofsheim (DE); Ulrich Peuchert, Bodenheim (DE); Fabian Wagner, Mainz (DE); Florian Resch, Mainz (DE); Laura Brückbauer, Dorn-Dürkheim (DE); Matthias Jotz, Mainz (DE); Vanessa Glaßer, Mainz (DE)

(73) Assignee: Schott AG, Mainz (DE)

( * ) Notice: Subject to any disclaimer, the term of this patent is extended or adjusted under 35 U.S.C. 154(b) by 845 days.

(21) Appl. No.: 17/375,268

(22) Filed: Jul. 14, 2021

(65) Prior Publication Data
US 2021/0340050 A1 Nov. 4, 2021

Related U.S. Application Data

(62) Division of application No. 15/882,187, filed on Jan. 29, 2018, now Pat. No. 11,091,383.
(Continued)

(30) Foreign Application Priority Data

Jan. 27, 2017 (DE) ...................... 10 2017 101 673.2
Jan. 9, 2018 (DE) ...................... 10 2018 100 299.8

(51) Int. Cl.
*C03B 33/02* (2006.01)
*B23K 26/0622* (2014.01)
(Continued)

(52) U.S. Cl.
CPC .......... *C03B 33/0222* (2013.01); *C03B 33/04* (2013.01); *C03B 33/06* (2013.01);
(Continued)

(58) Field of Classification Search
CPC ... C03C 23/008; G01L 9/0075; G01L 9/0042; B23K 2103/54
(Continued)

(56) References Cited

U.S. PATENT DOCUMENTS

| | | | |
|---|---|---|---|
| 5,919,607 A | 7/1999 | Lawandy | |
| 6,017,181 A | 1/2000 | Johnston | |

(Continued)

FOREIGN PATENT DOCUMENTS

| | | | | |
|---|---|---|---|---|
| WO | WO-2005063634 A1 * | 7/2005 | ................ | C03B 5/43 |
| WO | WO-2016114934 A1 * | 7/2016 | ......... | B23K 2103/50 |

OTHER PUBLICATIONS

Femtosecond laser-assisted three-dimensional microfabrication in silica (Year: 2001).*
(Continued)

*Primary Examiner* — Jeffrey T Carley
*Assistant Examiner* — William C. Gibson
(74) *Attorney, Agent, or Firm* — TAYLOR & EDELSTEIN, PC

(57) ABSTRACT

A method includes: providing a plate-like glass element having side faces and an ultrashort pulse laser having a laser beam; directing the laser beam onto one of the side faces; concentrating the laser beam by focusing optics to form an elongated focus in the glass element; producing a filament-shaped flaw in a volume of the glass element by a radiated-in energy of the laser beam, a longitudinal direction of which runs transverse to one of the side faces, and the ultrashort pulse laser radiates in a pulse or a pulse packet having at least two successive laser pulses to produce the filament-
(Continued)

shaped flaw; widening the filament-shaped flaw to form a channel by exposing the glass element to an etching including an etching medium which removes glass at a rate of less than 8 μm per hour; and introducing rounded, hemispherical depressions in a wall of the channel by the etching.

7 Claims, 10 Drawing Sheets

Related U.S. Application Data

(60) Provisional application No. 62/451,117, filed on Jan. 27, 2017.

(51) Int. Cl.
| | | |
|---|---|---|
| *B23K 103/00* | (2006.01) | |
| *C03B 33/023* | (2006.01) | |
| *C03B 33/04* | (2006.01) | |
| *C03B 33/06* | (2006.01) | |
| *C03B 33/07* | (2006.01) | |
| *C03B 33/08* | (2006.01) | |
| *C03C 15/00* | (2006.01) | |
| *C03C 23/00* | (2006.01) | |

(52) U.S. Cl.
CPC .......... *C03B 33/074* (2013.01); *C03B 33/082* (2013.01); *C03C 15/00* (2013.01); *C03C 23/0025* (2013.01); *B23K 26/0622* (2015.10); *B23K 26/0624* (2015.10); *B23K 2103/54* (2018.08); *C03B 33/023* (2013.01)

(58) Field of Classification Search
USPC .......................................................... 216/15
See application file for complete search history.

(56) References Cited

U.S. PATENT DOCUMENTS

| | | | |
|---|---|---|---|
| 6,107,181 | A | 8/2000 | Kitajima et al. |
| 8,584,354 | B2 | 11/2013 | Cornejo et al. |
| 9,517,963 | B2 | 12/2016 | Marjanovic et al. |
| 2015/0060402 | A1* | 3/2015 | Burkett ................ B23K 26/302 216/41 |
| 2017/0256422 | A1* | 9/2017 | Ambrosius ........ B23K 26/0624 |
| 2019/0157218 | A1* | 5/2019 | Jackl ................ H01L 23/49827 |

OTHER PUBLICATIONS

Chinese Office Action dated Jul. 9, 2020 for Chinese Application No. 201810081852.6 (8 pages).
English translation of Chinese Office Action dated Jul. 9, 2020 for Chinese Application No. 201810081852.6 (9 pages).

* cited by examiner

STRUCTURED PLATE-LIKE GLASS ELEMENT AND PROCESS FOR THE PRODUCTION THEREOF

CROSS REFERENCE TO RELATED APPLICATIONS

This is a division of U.S. patent application Ser. No. 15/882,187, entitled "STRUCTURED PLATE-LIKE GLASS ELEMENT AND PROCESS FOR THE PRODUCTION THEREOF," filed Jan. 29, 2018, which is incorporated herein by reference. U.S. patent application Ser. No. 15/882,187 is a non-provisional application based upon U.S. provisional patent application Ser. No. 62/451,117, entitled "STRUCTURED PLATE-LIKE GLASS ELEMENT AND PROCESS FOR THE PRODUCTION THEREOF", filed Jan. 27, 2017, which is incorporated herein by reference.

BACKGROUND OF THE INVENTION

1. Field of the Invention

The present invention relates generally to the structuring of glasses, and more particularly, to a laser-based process for structuring glass, and also the glass elements which can be produced thereby.

2. Description of the Related Art

The precise structuring of transparent, opaque and non-transparent glasses is of great interest in many fields of application. Here, precisions in the region of a few microns are required. The structuring relates to holes (round and angular), cavities, channels or any free shapes. In order to be used in a wide range of applications, the working should leave behind no damage, residues or stresses in the outer region or volume of the substrate. Furthermore, the process should allow a very efficient manufacturing process. Various methods can be employed for producing holes. Apart from sandblasting through appropriate masks, ultrasonic vibratory lapping is an established process. However, both methods are, due to their scale, restricted to small structures which are typically at about 400 µm in the case of ultrasonic vibratory lapping and at a minimum of 100 µm in the case of sandblasting. Owing to the mechanical removal of material, stresses in the glass, associated with flaking at the peripheral region of the hole, are produced in the case of sandblasting. Both processes are fundamentally unsuitable for the structuring of thin glasses.

In recent times, many laser sources have been used for the structuring of various materials. Here, virtually all known laser sources, e.g. $CO_2$ or CO lasers, diode-pumped ns, ps, and fs solid-state lasers having an infrared (e.g. 1064 nm), green (532 nm) and UV (365 nm) wavelength, have been used. Excimer lasers, which work at extremely short wavelengths (e.g. 193 nm, 248 nm), are also used for processing. The working of glasses is particularly demanding since they generally have a low thermal conductivity and a high susceptibility to fracture. All laser ablation processes therefore lead to more or less strong thermal stressing or heat input, which does decrease at shorter wavelengths and shorter pulse lengths but sometimes still leads to critical stresses through to microcracks and deformations in the peripheral region of the holes. At the same time, clearly measurable roughnesses are still produced on the hole walls when this process is used since all laser processes ablate in a cluster-like manner, i.e. the respective cluster size determines the residual roughness of the walls.

To produce very small structures in the surfaces, the laser ablation process is used. A disadvantage here is that deep structures can be achieved only with multiple passes over the work piece to be processed. The processing time is correspondingly slow. The process is therefore of only limited suitability for use in industrial manufacture. This applies particularly when through-openings or structures in general which extend from one side face to the opposite side face are to be introduced in glasses. The walls of such structures, e.g. of furrows, also have an inclination, i.e. are not perpendicular.

A further problem is, especially in the structuring of glasses as brittle-hard materials, that the structures introduced can significantly decrease the strength under flexural stresses. This applies particularly when the structures produced form part of an edge or an opening going through the glass.

What is needed in the art is a glass element having fine structures which extend between the side faces of the glass element but reduce the strength very little or even increase the strength.

SUMMARY OF THE INVENTION

The invention accordingly provides a plate-like or tabular glass element having two opposite side faces, generally running parallel to one another, and a channel which has been introduced into the glass of the glass element and joins the two side faces and opens into the side faces and has a rounded wall and a transverse dimension of less than 100 µm, for example less than 70 µm. The longitudinal direction of the channel runs transverse to the side faces. Here, the wall of the channel has a plurality of rounded, substantially hemispherical depressions. The longitudinal direction of the channel particularly may run perpendicular to the side faces, or accordingly parallel to the normal to the side faces. The channel opens into the side faces.

Such a glass element is produced by a laser-based process. The process of the invention for producing the plate-like glass element is based on:
  the laser beam of an ultrashort pulse laser being directed onto one of the side faces of the glass element and concentrated by focusing optics to form an elongated focus in the glass element, where
  a filament-shaped flaw is produced in the volume of the glass element by the radiated-in energy of the laser beam, the longitudinal direction of which runs transverse to the side face, in particular perpendicular to the side face, and the ultrashort pulse laser radiates in a pulse or a pulse packet having at least two successive laser pulses to produce a filament-shaped flaw and, after introduction of the filament-shaped flaw,
  the glass element is exposed to an etching medium which removes glass of the glass element at a removal rate of less than 15 µm, for example less than 10 µm, for example less than 8 µm per hour and
  the filament-shaped flaw widens to form a channel which consequently lies with its longitudinal direction in the direction of the longitudinal direction of the filament shaped flow and
  introduces rounded, substantially hemispherical depressions in the wall of the channel.

In some exemplary embodiments provided according to the invention, a method for producing a plate-like glass element includes the steps of: providing the plate-like glass element having a pair of side faces and an ultrashort pulse laser having a laser beam and focusing optics; directing the laser beam of the ultrashort pulse laser onto one of the side faces of the glass element; concentrating the laser beam by the focusing optics to form an elongated focus in the glass element; producing at least one filament-shaped flaw in a volume of the glass element by a radiated-in energy of the laser beam, a longitudinal direction of which runs transverse to the one side face of the side faces, and the ultrashort pulse laser radiates in a pulse or a pulse packet having at least two successive laser pulses to produce the at least one filament-shaped flaw, and, after introduction of the at least one filament-shaped flaw; widening the at least one filament-shaped flaw to form at least one channel by exposing the glass element to an etching process which includes an etching medium which removes a glass of the glass element at a removal rate of less than 8 μm per hour; and introducing rounded, substantially hemispherical depressions in a wall of the at least one channel by the etching process.

The pulse energy of the individual pulse is selected so that it is below the ablation threshold of the glass, so that the laser light can penetrate into the glass and the laser energy is not consumed at the surface by the ablation process.

The particular structuring of the lateral surface of the channels with substantially hemispherical depressions results in a number of advantages. Firstly, the rounded structures may represent a particularly advantageous shape in order to dissipate tensile stresses occurring on the surface down to the lowest point of the surface, namely the lowest points of the substantially hemispherical depressions. This effectively suppresses crack growth at possible defects in the surface.

In particular, parts of the glass element 1 can also be separated off by introduction of the channels when these are produced next to one another and edges, in particular also internal edges of openings, can thus be produced. Such openings may have a transverse dimension of at least 200 μm, for example at least 300 μm.

The substantially hemispherical depressions form, in particular, when a slow etching process is carried out. The abovementioned low etching rate of less than 15 μm per hour is therefore provided. Furthermore, the substantially hemispherical depressions are presumably brought about by structures which occur on introduction of the filament-shaped flaws. The burst mode with the inward radiation of a pulse packet can be used to achieve elongated, uniform flaws.

As etching medium, particular preference is given to an etching solution. In this embodiment, etching is thus carried out wet-chemically. This may be advantageous in order to remove glass constituents from the surface during etching. As etching solution, it is possible to use both acidic and alkaline solutions. As acidic etching media, HF, HCl, $H_2SO_4$, ammonium bifluoride, $HNO_3$ solutions or mixtures of these acids are particularly suitable. For basic etching media, KOH or NaOH solutions may be used. Greater rates of removal of material can typically be achieved using acidic etching solutions. However, basic solutions can be used, especially since only a slow removal of material is sought in any case.

Furthermore, etching can be carried out in a temperature range from 40° C. to 150° C., for example from 50° to 120°, for example up to 100° C.

In general, siliceous glasses having a low alkali metal content are particularly suitable for the structuring according to the invention. Excessively high alkali metal contents make etching more difficult. One embodiment of the invention therefore provides for the glass of the glass element to be a silicate glass having a content of alkali metal oxides of less than 17 percent by weight.

In the burst operating mode provided for the invention, the laser energy is not supplied as a single pulse but as a sequence of pulses which follow one another at short intervals and together form a pulse packet, known as a burst. Such a pulse packet typically has somewhat more energy than a single pulse in the conventional single-shot mode of operation. However, the pulses of a burst themselves contain significantly less energy than a single pulse. With regard to pulses within a burst, the pulse energies can be set flexibly, in particular so that the pulse energies either remain essentially constant or so that the pulse energies increase or so that the pulse energies decrease. In any case, the surface structure according to the invention with a channel having the concave, rounded pits or the substantially hemispherical depressions is obtained particularly when the filament-shaped flaws are introduced by laser pulses in the burst mode.

One suitable laser source according to the present invention is a neodymium-doped yttrium-aluminum garnet laser having a wavelength of 1064 nanometers.

The laser source produces, for example, an initial beam having a $(1/e^2)$ diameter of 12 mm; a biconvex lens having a focal length of 16 mm can be used as optics. To produce the initial beam, it is optionally possible to use suitable beam-forming optics, for example a Galileo telescope.

The laser source operates, with a repetition rate in the range from 1 kHz to 1000 kHz, for example from 2 kHz to 100 kHz, for example from 3 kHz to 200 kHz.

The repetition rate and/or the scanning rate can be selected so that the desired distance between neighboring filament-shaped flaws is achieved.

A suitable pulse duration of a laser pulse can be in the range of less than 100 picoseconds, for example than 20 picoseconds.

The typical power of the laser source can be in the range from 20 to 300 watt. In order to achieve the filament-shaped flaws, a pulse energy in the burst of more than 400 microjoule is used in an embodiment of the invention; a total burst energy of more than 500 microjoule may be more advantageous.

When the ultrashort pulse laser is operated in the burst mode, the repetition rate is the rate of repetition of the release of bursts. The pulse duration depends mainly on whether a laser is operated in single-pulse operation or in the burst mode. The pulses within a burst typically have a similar pulse length as a pulse in single-pulse operation. The burst frequency can be in the range from 15 MHz to 90 MHz, for example in the range from 20 MHz to 85 MHz, and is for example 50 MHz and the number of pulses in the burst can be in the range from 1 to 10 pulses, e.g. 6 pulses.

In order to achieve opening of the channels into both side faces, the filament-shaped flaw can go essentially completely across the glass element, but it is not necessary for a flaw going all the way through to be observed. The filament-shaped flaw can, for instance, also be a sequence of local defects arranged in succession. In order to produce a channel running through the glass element 2, however, relatively thin glass elements are generally suitable in any case. The thickness range for the glass elements may be from 30 microns to 3 millimeters.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
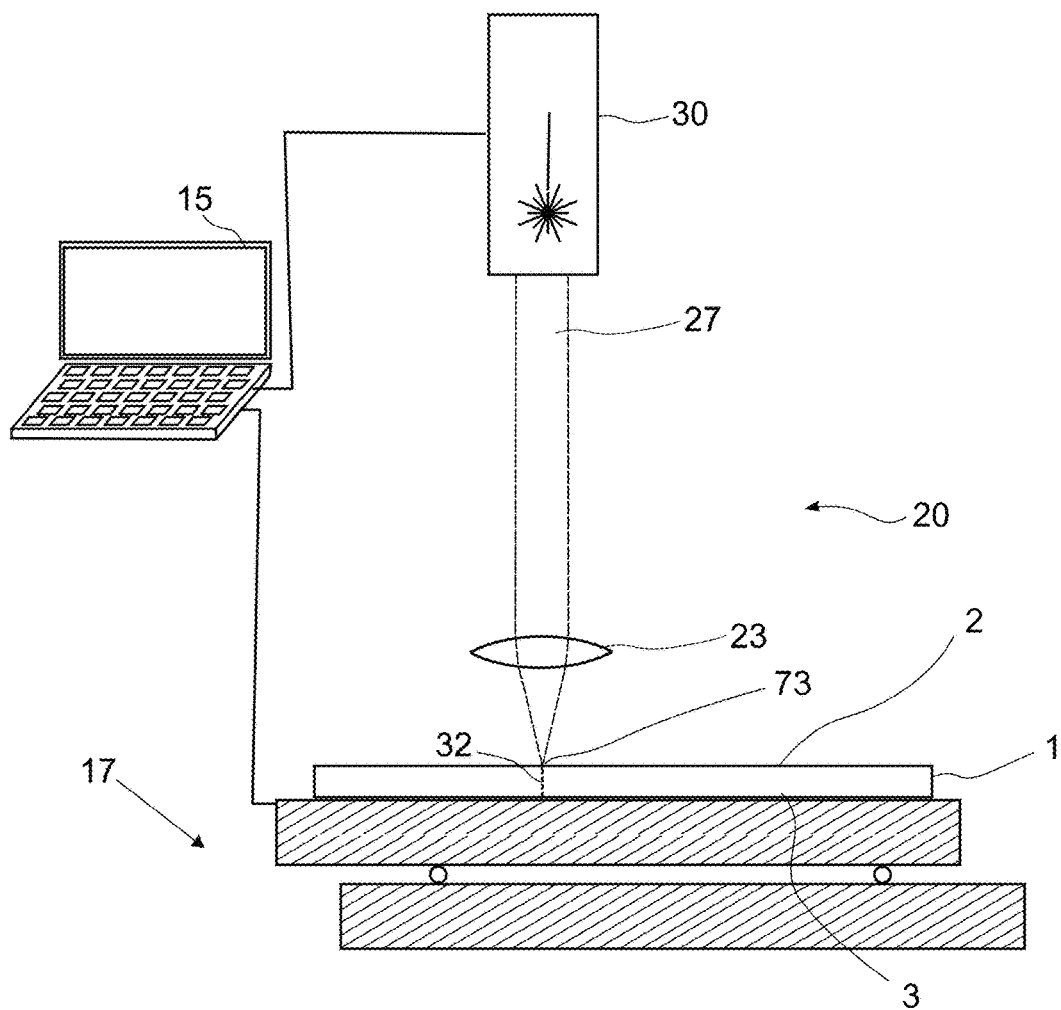
FIG. 1 is an apparatus for laser working of the glass elements as preparation for subsequent etching.

FIG. 1 shows a working example of a laser processing apparatus 20, from which filament-shaped flaws 32 can be introduced into a glass element 1 in order to introduce channels at the positions of the filament-shaped flaws 32 in a subsequent etching process. The apparatus 20 includes an ultrashort pulse laser 30 having preceding focusing optics 23 and a positioning device 17. The positioning device 17 enables the point of impingement 73 of the laser beam 27 of the ultrashort pulse laser 30 to be positioned laterally on the side face 2 of a plate-like glass element 1 to be worked. In the example depicted, the positioning device 17 comprises an x-y table on which a side face 3 of the glass element 1 rests. However, as an alternative or in addition, it is also possible to make the optics mobile in order to move the laser beam 27 so that the point of impingement 32 of the laser beam 27 can be moved with the glass element 1 remaining fixed.

The focusing optics 23 then focus the laser beam 27 to form a focus which is elongated in the direction of the beam, i.e. accordingly transverse, in particular perpendicular, to the irradiated side face 2. Such a focus can, for example, be produced by way of a conical lens (known as an axikon) or a lens having great spherical aberration. The control of the positioning device 17 and of the ultrashort pulse laser 30 may be effected by way of a programmed computer 15. In this way, predetermined patterns of filament-shaped flaws 32 distributed laterally along the side face 2 can be produced, in particular by input of positional data, for example from a file or via a network.

According to one embodiment, the following parameters can be used for the laser beam:

The wavelength of the laser beam is 1064 nm, typical for a YAG laser. A laser beam having an initial beam diameter of 12 mm is produced, and this is then focused by way of optics in the form of a biconvex lens having a focal length of 16 mm. The pulse duration of the ultrashort pulse laser is less than 20 ps, for example about 10 ps. The pulses are emitted in bursts of 2 or more, for example 4 or more pulses. The burst frequency is 12-48 ns, e.g. about 20 ns, the pulse energy is at least 200 microjoule and the burst energy is accordingly at least 400 microjoule.

Subsequently, after introduction of one or in particular more than one filament-shaped flaw(s) 32, the glass element 1 is taken out and placed in an etching bath where, in a slow etching process, glass is removed along the filament-shaped flaws 32 so that a channel is introduced into the glass element 1 at the position of such a flaw 32.

A basic etching bath may have a pH of >12, for example a KOH solution having a concentration of >4 mol/l, for example >5 mol/l, for example >6 mol/l, but <30 mol/l. Etching is, in one embodiment of the invention, carried out at a temperature of the etching bath of >70° C., for example >80° C., or >90° C., irrespective of the etching medium used.

Figure 2:
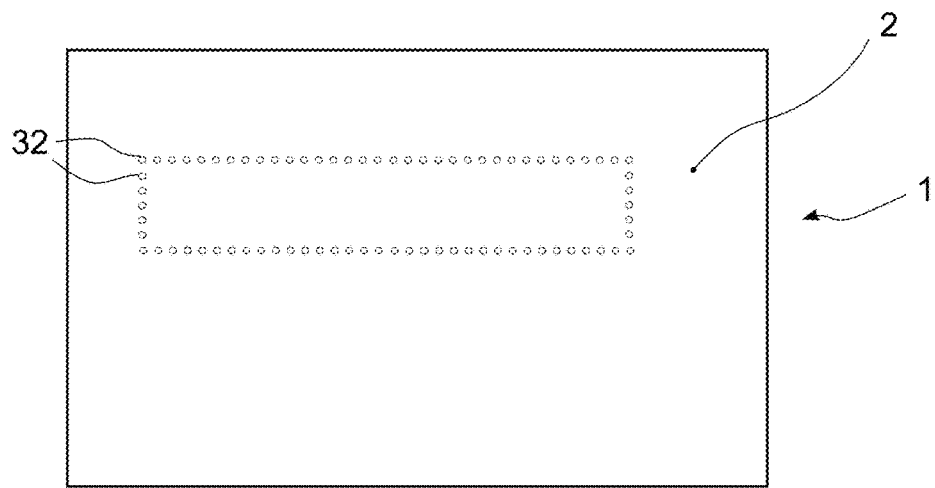
FIG. 2 illustrates a glass element with introduced filament-shaped flaws.

FIG. 2 shows, in plan view onto a side face 2, a glass element 1 having a plurality of filament-shaped flaws 32 which are arranged in a particular pattern as can be inscribed in the glass element 1 by the above-described computer-controlled actuation of the positioning device 17 and the ultrashort pulse laser 30. The filament-shaped flaws 32 may have here been introduced, by way of example, along a prescribed path in the form of a closed rectangular line into the glass element 1. The corners of the line can also be slightly rounded. A person skilled in the art will be able to see that not only rectangular paths but also paths of any shape can be produced by way of the process.

Figure 3:
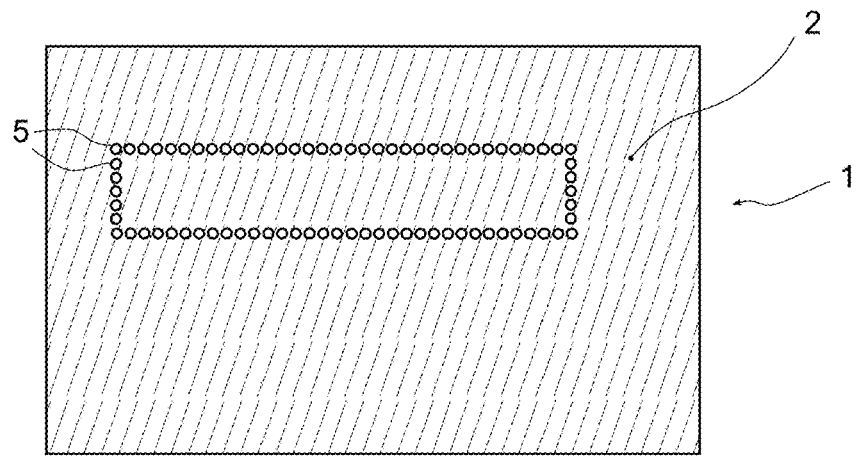
FIG. 3 illustrates the glass element with channels introduced along the filament-shaped flaws.

FIG. 3 shows the glass element 1 after a subsequent etching step. Instead of the filament-shaped flaws 32, channels 5 which are arranged next to one another along the prescribed path and form a row are now present. The glass element 1 is shown as a hatched area in order to distinguish the element from openings, e.g. the channels 5 in the drawing.

The channels 5 which have been introduced and are arranged next to one another to form a row along the path over which the laser travels can now serve as predetermined fracture positions in order to separate off part of the glass element 1, or the glass element 1, along this path.

Figure 4:
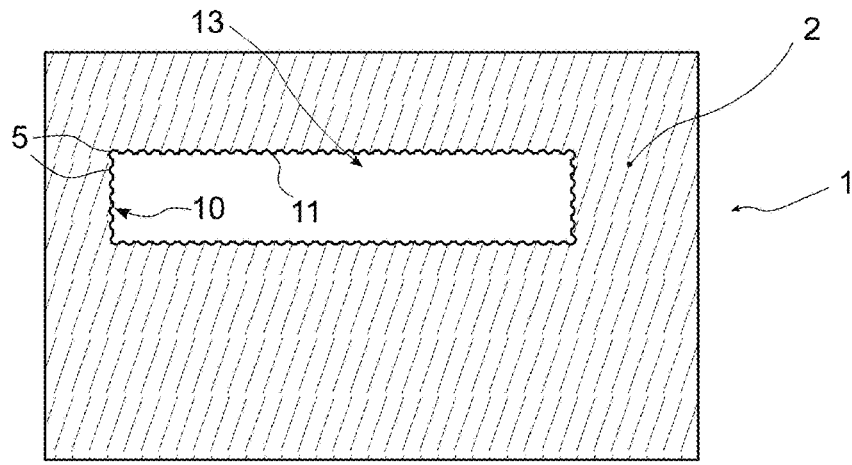
FIG. 4 illustrates the glass element after a part has been separated off.

FIG. 4 shows the glass element after parting along the path. Since the channels were arranged along a rectangular, closed parting line, an inner part is detached and an opening 13 is created in the glass element 1 by the parting operation.

Quite generally, without being restricted to the specific working example, a plate-like glass element 1 having a channel 5 which is open at the side and forms part of an edge 10 of the glass element 1 is formed by parting along a line running through one or more channels 5.

Furthermore, as shown in FIG. 3, glass material was still present between the channels 5. Accordingly, inner part and surrounding glass element 1 were still joined to one another after etching. The final parting operation can then be performed, for example, by breaking. Owing to the perforation created by the channels 5 arranged next to one another, the glass element 1 breaks along the path of the channels 5 arranged in a row. In general, without being restricted to the example shown, an edge 10 in which, as depicted in FIG. 4, flat edge sections 11 extend between the channels 5 is created in this way. The flat edge sections 11 are formed on fracture of the glass between the channels 5.

In order to detach an inner part and/or produce an opening 13 in a glass element 1, a variant of the above-described method can be suitable. This embodiment of the invention is based on the diameter of the channels 5 being increased by etching to such an extent that the glass between the channels 5 is removed and the channels 5 join.

Figure 5:
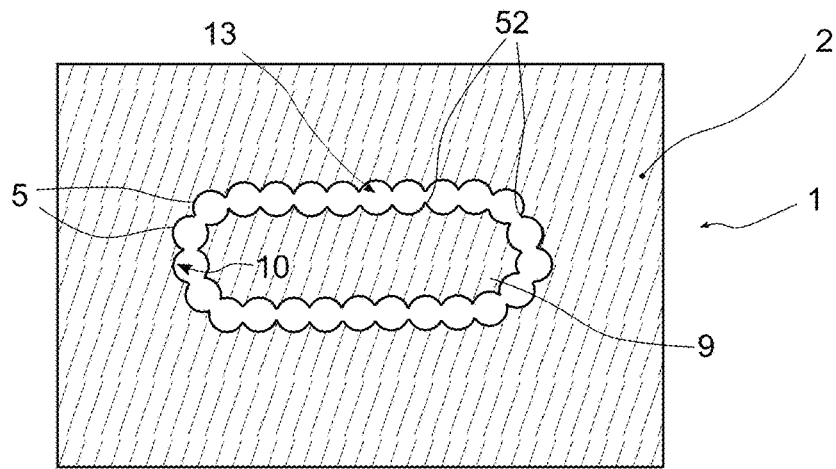
FIG. 5 illustrates a variant of the glass element shown in FIG. 4.

A glass element 1 in which the channels 5 have joined at the sides as a result of etching is shown in FIG. 5. As in the example of FIG. 4, the channels 5 are arranged next to one another in a row along a closed path. Accordingly, an opening 13 and a complementary inner part are in turn produced by the detaching operation. In the example depicted, the inner part 9 has been separated off but is still arranged in the opening 13.

FIG. 2 to FIG. 5 are examples of an embodiment of the invention according to which an edge 10 of the glass element 1 which has a plurality of channels 5 which run parallel next to one another and are open at the sides is created.

Furthermore, all these examples are based on an embodiment of the process of the invention in which the point of impingement 73 of the laser beam 27 on the glass element 1 is conveyed along a prescribed path and a plurality of filament-shaped flaws 32 located next to one another on the path are introduced into the glass element 1 and a plurality of channels 5 located next to one another are subsequently introduced by etching into the glass element 1, and the glass element 2 is then parted along the path so as to form an edge 10 having channels 5 which are open at the side.

The channels 5 generally have a tubular cylindrical basic shape, or are tubular with a cylindrical wall. Here, a slight taper from the opening at the side face to the middle of the glass element 1 can be present. When the generally cylindrical channels 5 are joined in the course of widening during the etching operation, ridges are formed at the abutting positions. In general, without being restricted to the example of FIG. 5, one embodiment of the invention provides for the channels 5 to adjoin one another so as to form ridges 52 which are located between the channels 5 and run parallel to the longitudinal direction 51 of the channels 5.

These ridges or ribs accordingly run parallel to the longitudinal direction of the channels and can therefore be seen only as serrations or tooth-like elements at the position of the transition region between neighbouring channels 5 in the depiction of FIG. 5.

Figure 6:
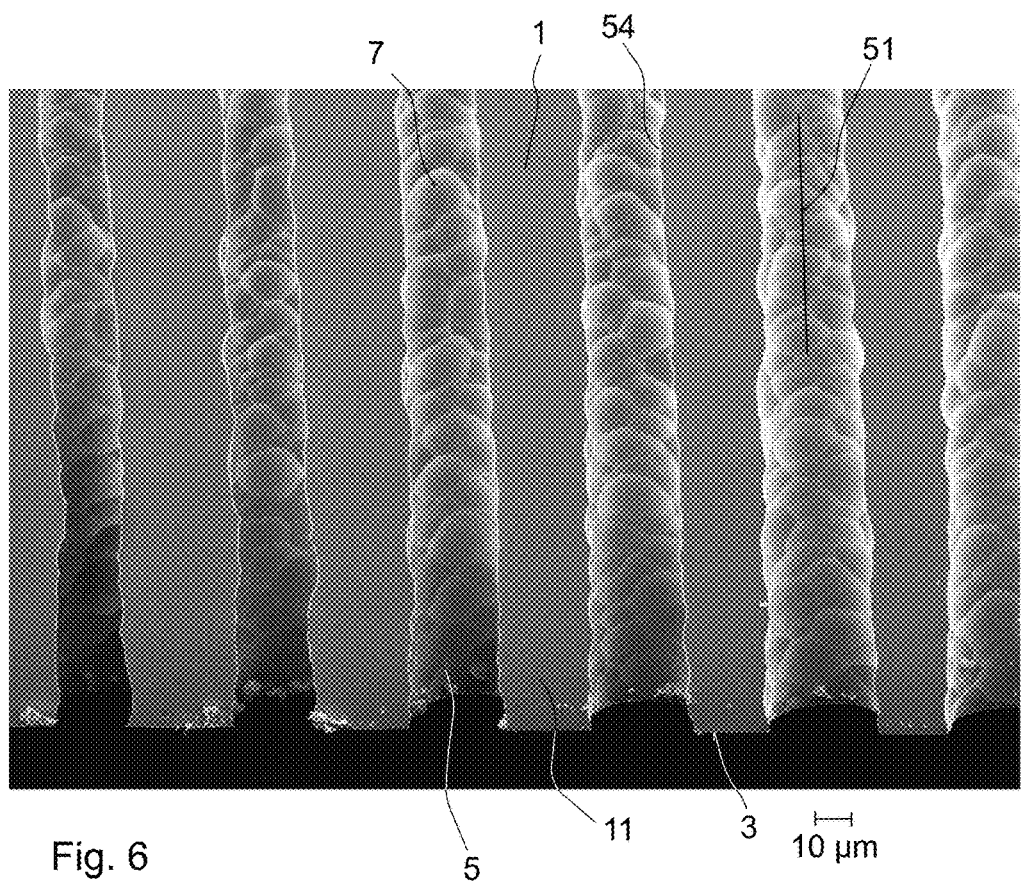
FIG. 6 and FIG. 7 illustrate electron micrographs of an edge of a glass element in different enlargements.
Figure 7:
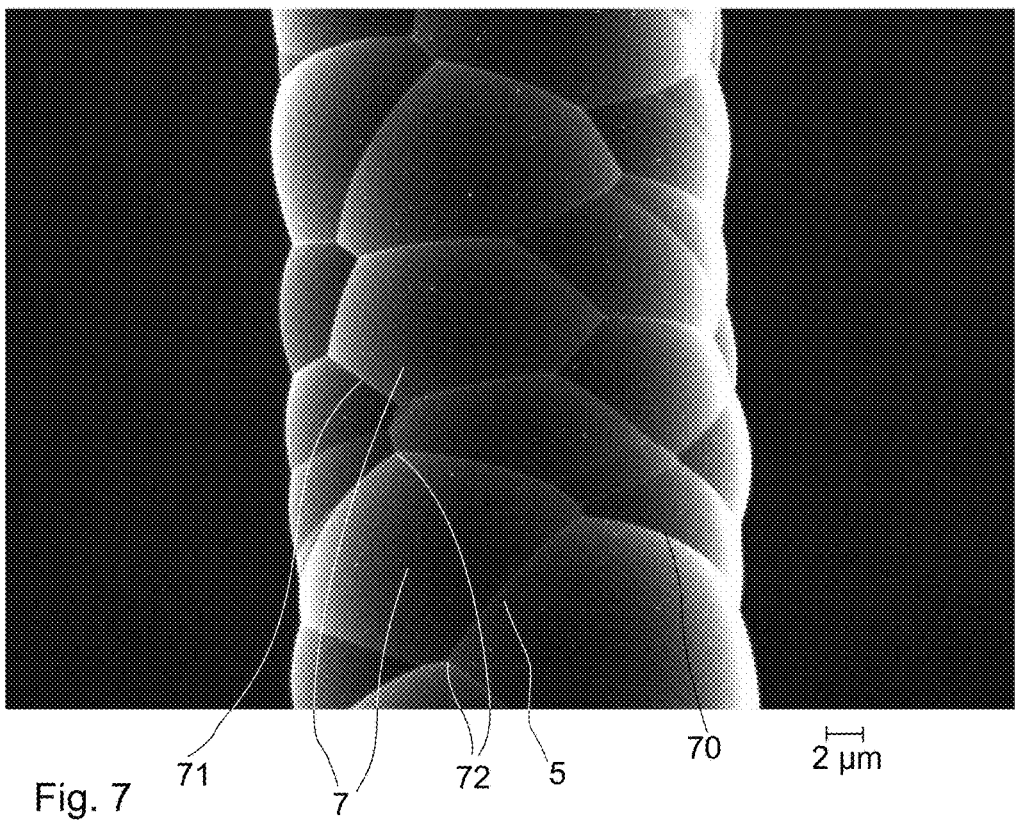

FIG. 6 and FIG. 7 show electron micrographs of the edge 10 of a glass element 1 which has been worked according to the invention. Here, FIG. 7 was taken at a greater enlargement. As in the examples of FIG. 4 and FIG. 5, the edge 10 has a plurality of channels 5 which run parallel to one another and are open at the side. In the depiction of FIG. 6 in plan view onto the edge 10, it can be seen that the longitudinal direction 51 extends transversely, in particular perpendicularly, to the side faces 2, 3. However, in the section depicted in FIG. 6, only the transition of the edge 10 to one of the side faces, here denoted as side face 3, is to be seen. In a manner analogous to the example of FIG. 3, the edge 10 has flat edge sections 11 in addition to the channels 5 open at the side. The edge 10 was thus produced by breaking along the parting line which has been weakened by the channels 5.

The spacing of the channels 5 is relatively large at about 50 μm in this example. The spacing can also be made smaller, especially in the case where the channels 5 go directly into one another without flat edge sections 11. In general, the spacing of the channels (also referred to as "pitch") may be in the range from 3 to 70 microns. This spacing is measured from the middle to the middle of the channels. The transverse dimension, or the diameter of the channels 5, is, as indicated above, less than 100 microns. The diameter may be in a similar region to the spacing of the channels 5. Without being restricted to the examples described here, the diameter may be in the range from 3 microns to 50 microns. In the example of FIG. 6 and FIG. 7, the diameter is about 30 microns.

The depth of the substantially hemispherical depressions 7 is typically less than 5 μm, at transverse dimensions of typically 5-20 μm.

It can be seen that the area of the edge 10 is greater than the area of a flat edge as a result of channels 5 having an approximately semicircular cross section through the lateral opening. If the channels 5 were to adjoin one another directly and have a precisely semicircular cross section, the length of the edge line parallel to the side faces 2, 3 would be greater by a factor of $\pi/2$ than the edge line of a smooth edge. The increases in the area which can be achieved by the process of the invention are somewhat smaller and are generally in the region of from 10 to 40 percent. According to one aspect of the invention, a plate-like glass element 1 having two opposite side faces 2, 3 and an edge 10, where the edge has a plurality of channels 5 which run parallel to one another and are open at the side and have a rounded wall 54 and a transverse dimension of less than 200 μm and whose longitudinal direction 51 runs transverse, e.g. perpendicular, to the side faces 2, 3 and which also end at the side faces 2, 3, or open into these, with the surface area of the edge 10 being increased by a factor of from 1.1 to 1.4 by the channels 5 compared to a smooth edge face without channels 5, is therefore provided. The edge 10 can be an outer edge or else, as in the examples of FIG. 4 and FIG. 5, an inner edge which delimits an opening 13. Thus, openings having a transverse dimension of at least 200 μm, for example also more than 300 μm, may be produced. The transverse dimension here is the longest lateral extension of the opening. In the case of a circular opening, the transverse dimension thereof is given by the diameter.

This increase in the surface area gives a comparatively fracture-stable edge under flexural stresses, which is surprising in so far as the fracture probability normally correlates with the surface area. The structures projecting beyond the rounded channel probably lead to defects on these projected structures (ridges or flat edge sections) not being able to propagate far. Crack propagation is thus suppressed by the structuring of the edge 11.

This effect is reinforced further by the inventive fine structure of the channels 5 which is explained in more detail below. In FIG. 6 and FIG. 7, the fine structure of the channels 5 in the form of substantially hemispherical or rounded, cap-like depressions 7 can clearly be seen. As a result of the slow etching process, the substantially hemispherical depressions 7 adjoin one another, with the abutting concave roundings of the depressions 7 forming ridges 70.

Furthermore, it can be seen that the ridges 70 form polygonal delimiting lines 71 of the depressions 7 when looked at in plan view onto the depressions 7. Here, the average number of the corners 72 of the delimiting lines 71 of the depressions 7 may also be less than eight, for example less than seven. The latter feature is obtained when the regions included by most of the substantially hemispherical depressions are convex in the mathematical sense.

The ridges 70 of the channel 5 shown in FIG. 7 are very narrow, and there are no discernible regions in which the concave curvatures of the depressions 7 go over into one another via a convexly domed region on the ridge 70. The structure of the channels 5 can therefore, according to an embodiment of the invention, also be described by the proportion by area of convex regions in a channel 5 being less than 5%, e.g. less than 2%.

The glass element 1 of the example shown in FIG. 5 and FIG. 6 is a siliceous glass having a low alkali metal content, specifically a borosilicate glass having a coefficient of thermal expansion of $3.3*10^{-6}$ $K^{-1}$. As borosilicate glass, a glass may have the following composition:

| Composition | (% by weight) |
|---|---|
| $SiO_2$ | 63-83 |
| $Al_2O_3$ | 0-7 |
| $B_2O_3$ | 5-18 |
| $Li_2O + Na_2O + K_2O$ | 4-14 |
| $MgO + CaO + SrO + BaO + ZnO$ | 0-10 |
| $TiO_2 + ZrO_2$ | 0-3 |
| $P_2O_5$ | 0-2 |

Figure 8:
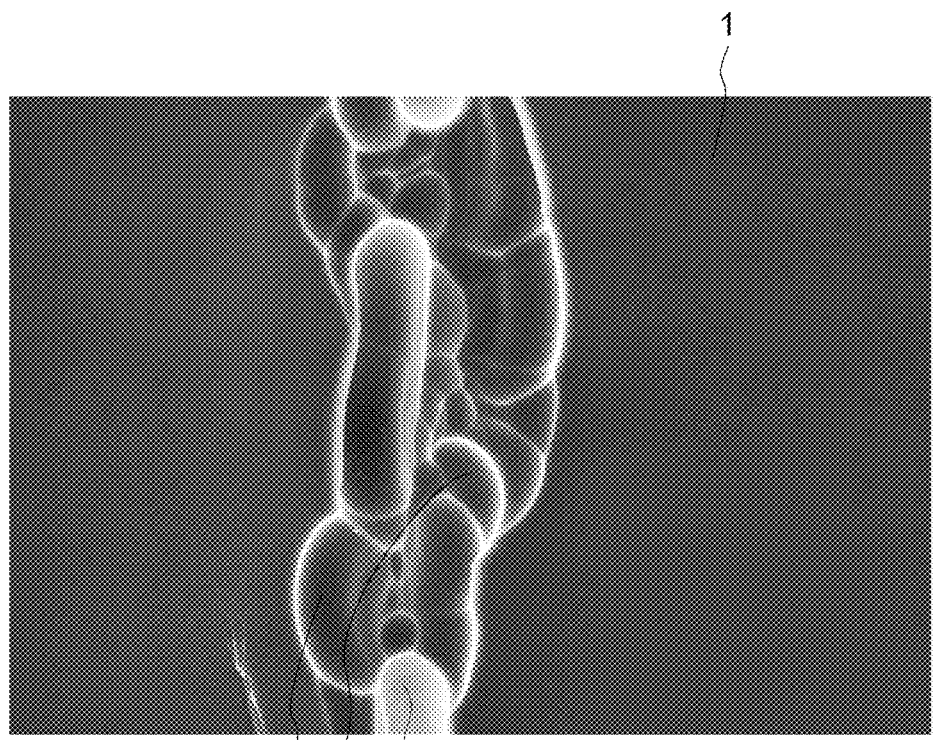
FIG. 8 and FIG. 9 illustrate electron micrographs of channels which have been introduced using different laser parameters.
Figure 9:
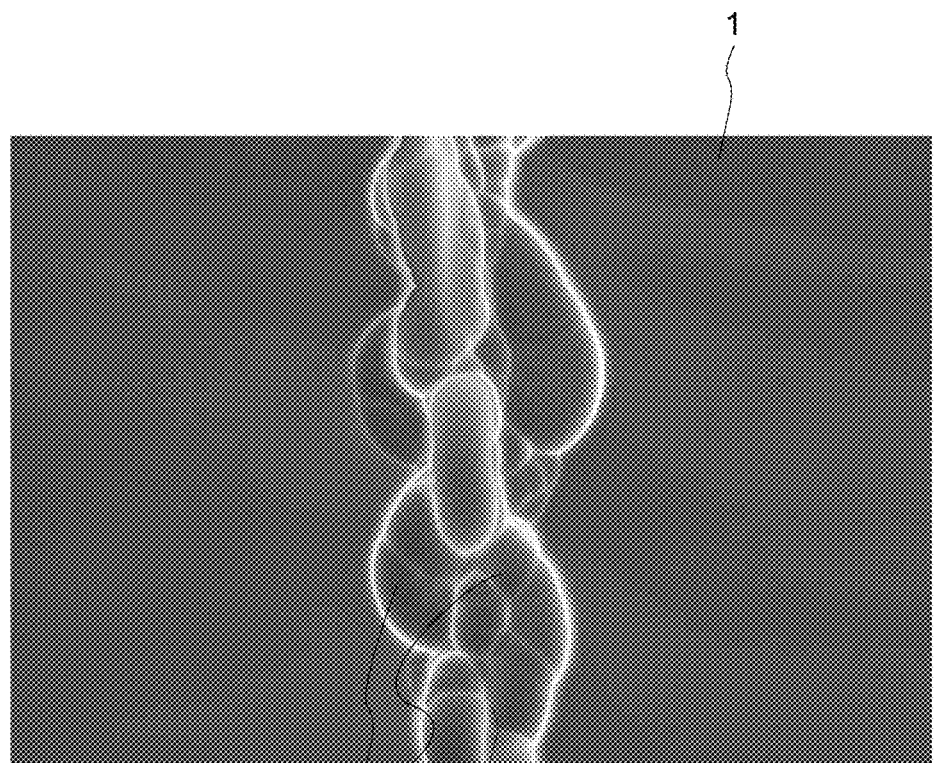

FIG. 8 and FIG. 9 show electron micrographs of channels which have been introduced into a borosilicate glass marketed under the tradename D263® by Schott. Different laser parameters were used here. In the example of FIG. 8, a burst having 8 individual pulses was used, with the repetition rate of the laser being 100 kHz. In the example shown in FIG. 9, a higher repetition rate of 200 kHz was used, but a burst having only two individual pulses was employed. In each case, however, only a single burst was radiated in for each channel 5. The channels 5 were then etched in a KOH solution at 80° C. for a time of 8 hours. The structure of the channels 5 is similar, with the substantially hemispherical depressions 7 appearing even more concave because of the smaller diameter compared to the example of FIG. 6 and FIG. 7. On further etching, the structure approaches that of FIG. 6 and FIG. 7.

A further glass from the class of low-alkali siliceous glasses which is well suited to the process of the invention is an alkali metal-free aluminasilicate glass. A glass may have the following composition:

| Composition | (% by weight) |
|---|---|
| $SiO_2$ | 50-75 |
| $Al_2O_3$ | 7-25 |
| $B_2O_3$ | 0-20 |
| $Li_2O + Na_2O + K_2O$ | 0-0.1 |
| $MgO + CaO + SrO + BaO + ZnO$ | 5-25 |
| $TiO_2 + ZrO_2$ | 0-10 |
| $P_2O_5$ | 0-5 |

Without being restricted to the abovementioned compositions, the glasses may have basicities in the range from 0.45 to 0.55, for example in the range from 0.48 to 0.54. This makes the glasses suitable for slow, controlled etching using basic etching media, but etching using acidic etching media also remains possible.

The embodiments described hitherto can have the disadvantage that not only the filament-shaped flaw but also both side faces 2, 3 of the glass element 1 are etched. Although the etching rate here is lower than within the channels 5, the decrease in thickness can nevertheless be undesirable. It may also be desirable not to alter the surface of the glass by way of the etching process. To avoid these disadvantages, a further embodiment of the invention provides for the surface of the glass element 1 to be covered in a first step by a polymer coating (for example a film or a surface coating) which is removed locally on introduction of the laser light. Thus, the polymer coating remains in the regions which surround the point of impingement of the laser and thus also the filament-shaped flaw and thus protects these regions of the side faces during subsequent etching.

Figure 10:
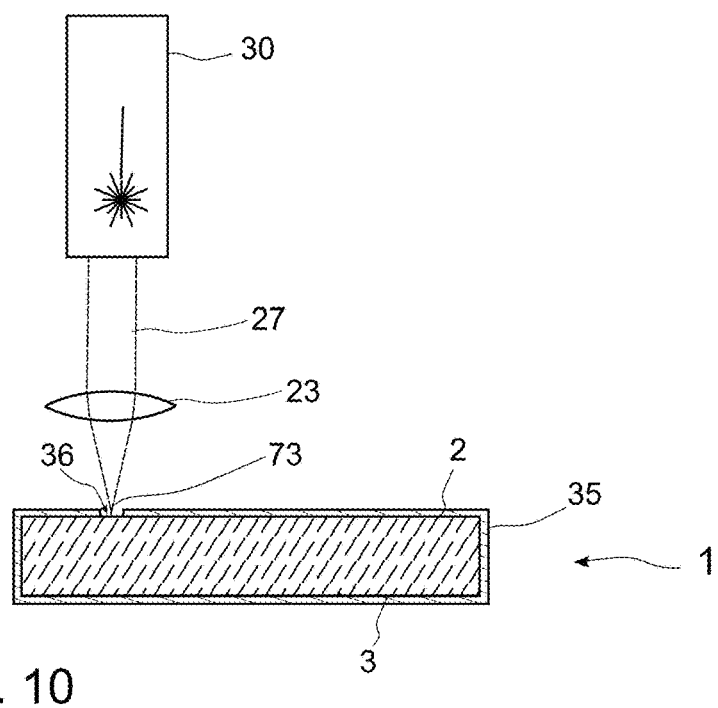
FIG. 10, FIG. 11, and FIG. 12 illustrate process steps according to an embodiment of the invention with the aid of cross-sectional views.
Figure 11:
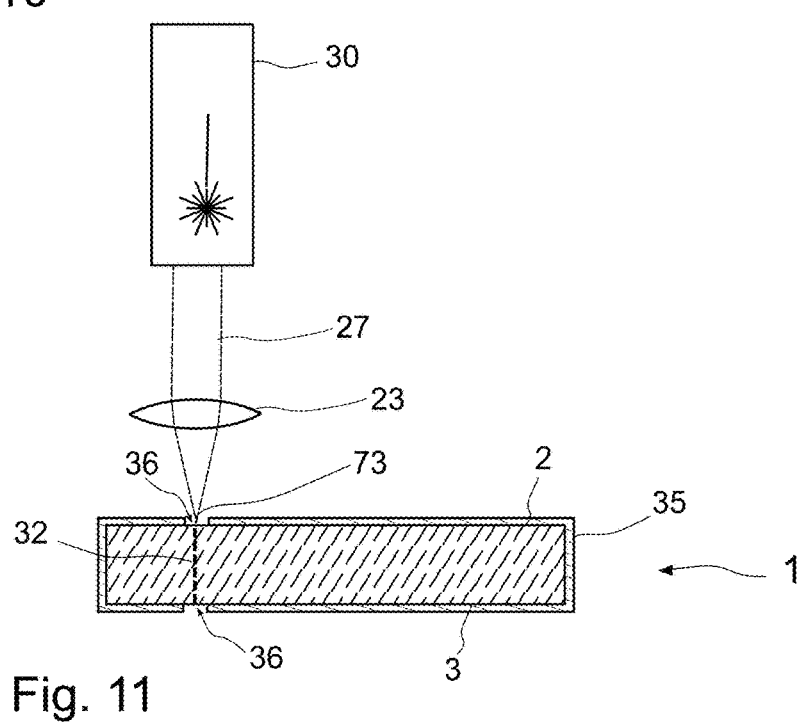
Figure 12:
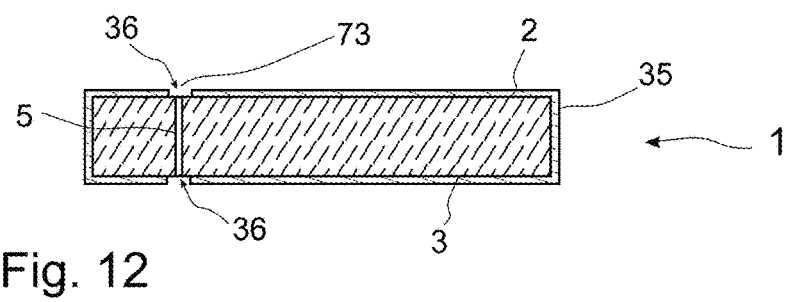

The process and the glass element obtained are depicted in FIG. 10 to FIG. 12.

This embodiment of the invention is thus based on at least one side face 2, 3, for example both side faces 2, 3 as shown in FIG. 10, being provided with a polymer layer 35 before irradiation with the laser beam 27.

A glass element 1 as is shown schematically in FIG. 12 is obtained. If the diameter of the channel 5 is smaller than the diameter of the ablated opening 36 in the polymer layer 35, a glass element 1 in which the channel 5 is surrounded by a region having an etched surface is obtained, with this etched region on the side face once again being surrounded by an unetched region.

Figure 13:
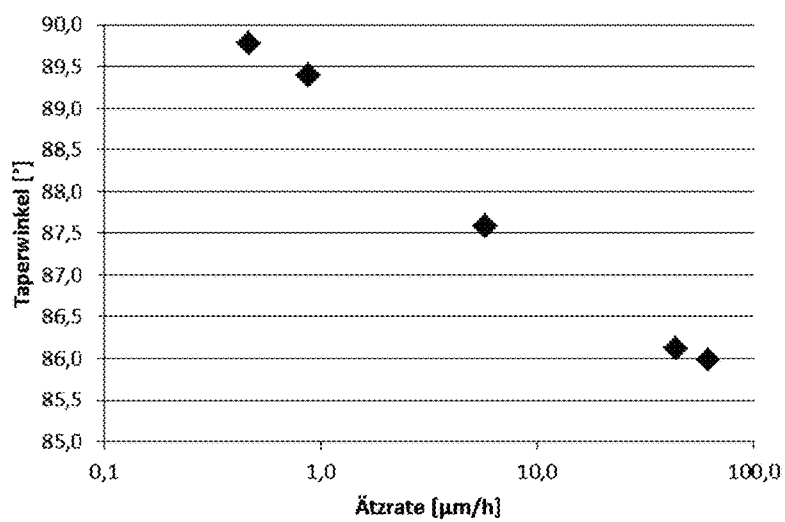
FIG. 13 is a graph of the angle of taper of the channels as a function of the etching rate.

It can be seen even from FIG. 7 that the channels 5 which can be produced according to the invention have a substantially cylindrical basic shape. Associated therewith, angles of taper approximating 90° can be produced. The angle of taper of a channel 5 is the angle of the wall of the channel relative to the respective side face 2, 3. This angle can, inter alia, vary locally owing to the fine structure of the channels with the substantially hemispherical depressions 7 and is therefore determined by averaging. Simple averaging can be determined by calculation of the angle of taper from the aspect ratio of the channel 5. The aspect ratio is the ratio of the depth of a channel to the smallest channel diameter. In the case of an open channel 5 as is provided according to the invention, the half channel length can for this purpose be divided by the difference between hole diameter at the side face to hole diameter at half the length of the channel. FIG. 13 shows measured values of the angle of taper in the case of etching by way of sodium hydroxide solution as a function of the etching rate. The smaller the etching rate, the more closely does the angle of taper approximate a right angle. In the case of the etching rate of less than 8 μm per hour as employed according to the invention, the angle of taper is in this example greater than 87°. The angle of taper can be influenced not only by the etching rate but also by the type of glass and the etching medium. In general, however, the angle of taper of the at least one channel 5 deviates from a right angle by less than 5°, for example less than 3°, or even less than 1°, according to an embodiment of the invention.

Figure 14:
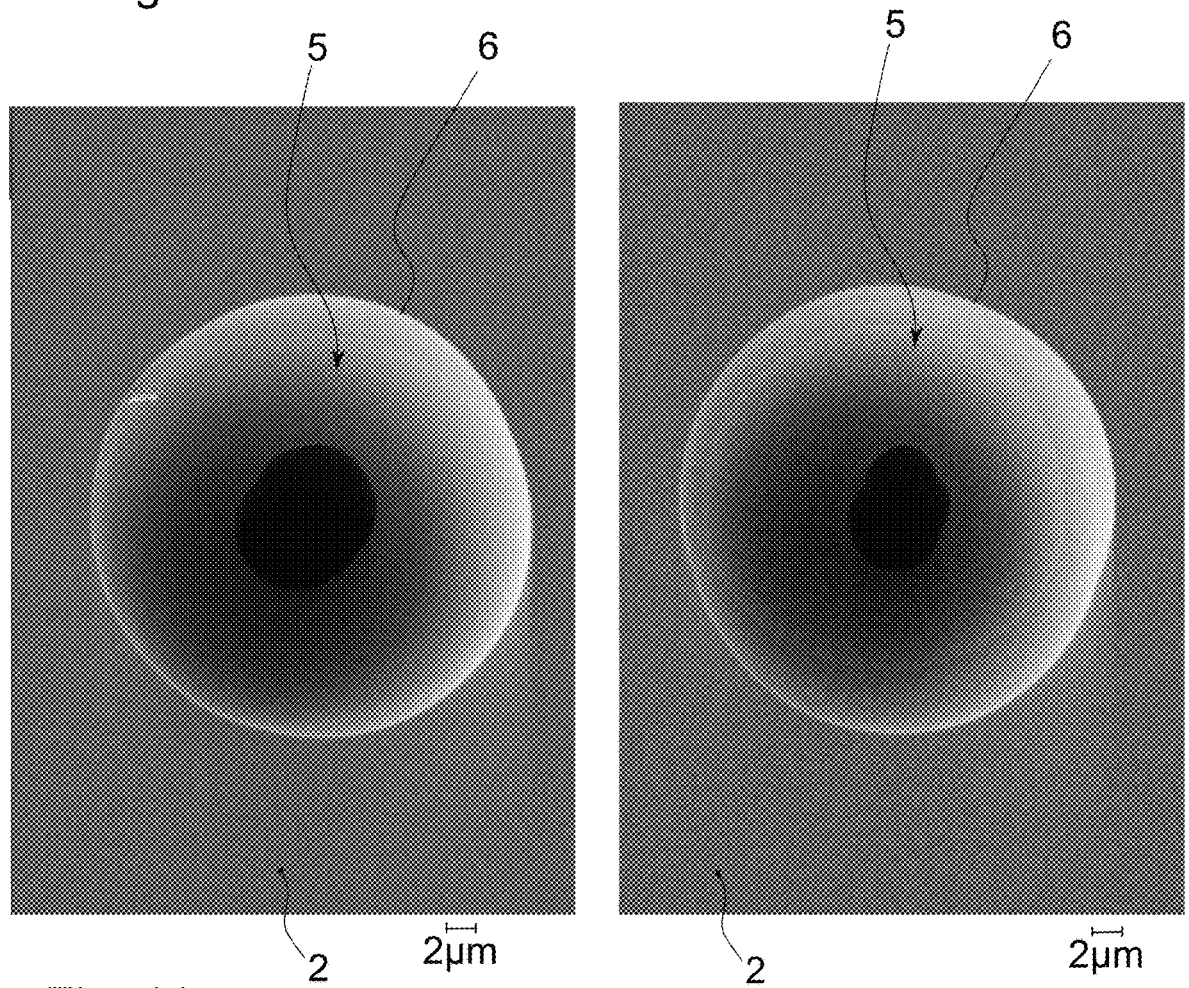
FIG. 14 illustrates two electron micrographs of the openings of channels.

A very circular cross section superimposed by small deviations from the circular shape as a result of the substantially hemispherical depressions 7 can also be achieved by way of the process of the invention. FIG. 14 shows two electron micrographs of the opening 6 of channels 5 which have been etched by way of an NaOH solution into the glass element 1. As can be seen, the openings 6 of the channels 5 are virtually circular. As a measure of the circulatry, a roundness deviation can be defined. This is the ratio of circumference of the opening 6 to the circumference of a circle having the same enclosed area. A perfectly circular channel would accordingly have a roundness deviation of 1.0. It has been found that, in general, a roundness deviation of less than 1.15 is achieved by way of the process of the invention, both on etching with HF and also with KOH or NaOH, despite the substantially hemispherical depressions 7. The roundness deviation can also be determined for channels 5 which are open at the side and are part of an edge 10 by, for example, calculating this value in an analogous manner for a circular segment.

The invention is suitable, inter alia, for producing interposers for electronic or microfluidic applications. For electronic applications, the channels 5 or openings having inner edges according to the invention can be filled with a conductive material in order to produce electric contacts from one side face to the other side face. Likewise, the channels 5 or larger openings produced by the channels 5 can serve for the conduction of fluids. If material is introduced into the channels 5, for instance to produce electric conduits through the glass element, the substantially hemispherical depressions 7 offer the advantage that this material can anchor readily in the channels 7. In the conduction of fluids, the depressions 7 can, on the other hand, reduce the flow resistance. Suitable applications are MEMS components. Here, particular mention may be made of a pressure sensor in which the glass element is fastened to a cap which deforms under the action of pressure. Here, openings for leading electric contacts to the cap and, particularly for a differential or relative pressure measurement, to allow pressure equilibration to the gas volume enclosed in the cap can be provided. Such a pressure sensor can measure capacitively, piezoresistively or resistively. In a resistive measurement, electric resistance layers which are connected to form a Wheatstone bridge can be provided in the cap. The voltage measured at the bridge is then proportional to the pressure-related deformation of the membrane.

A pressure sensor comprising a glass element according to the invention can, inter alia, be used in the following applications: a fuel pressure sensor in injection systems, an oil pressure sensor in gearboxes, a sensor in an airbag or for air pressure, e.g. for altitude measurements, a tyre pressure sensor.

If the spacing of the filament-shaped flaws is small, the channels 5 can quickly go over into one another during etching. The longer the etching process continues, the more do the structures produced by the channels 5 flatten. In contrast, the structure of the adjoining substantially hemispherical depressions 7 is retained. A further embodiment of the invention accordingly provides a plate-like glass element 1 having two opposite side faces 2, 3 and an edge 10 joining the two side faces 2, 3, with the edge 10 having a plurality of adjoining, rounded, substantially hemispherical depressions 7. Regardless of whether channels 5 can additionally be discerned, the lateral dimension or average transverse dimension of the depressions 7 is typically on average less than the depth thereof. The depressions 7 thus represents flat pans.

In order to obtain an essentially flat edge 10 without visible channels 5 running next to one another, a spacing of the filament-shaped flaws of less than 6 μm, e.g. less than 5 μm, can be used. An embodiment of the invention accordingly provides a process for producing a plate-like glass element 1 having a structured edge 10, wherein
the laser beam 27 of the ultrashort pulse laser 30 is directed onto one of the side faces 2, 3 of the glass element 1 and concentrated by focusing optics 23 to form an elongated focus in the glass element 1, where
the point of the impingement 73 of the laser beam 27 on the glass element 1 is moved along a prescribed path and
a plurality of filament-shaped flaws 32 located next to one another on the path at a spacing of not more than 6 μm, the longitudinal direction of which runs transverse to the side face 2, 3, in particular perpendicular to the side face 2, 3, are introduced by way of the laser beam and
the glass element 1 is exposed to an etching medium 33 which removes the glass of the glass element 1 at a removal rate of less than 8 μm per hour and
widens the filament-shaped flaws 32 to form channels 5 and the diameter of the channels 5 is increased by the etching to such an extent that the glass between the channels 5 is removed and the channels 5 join to form an edge 10 which divides the glass element 1.

Figure 15:
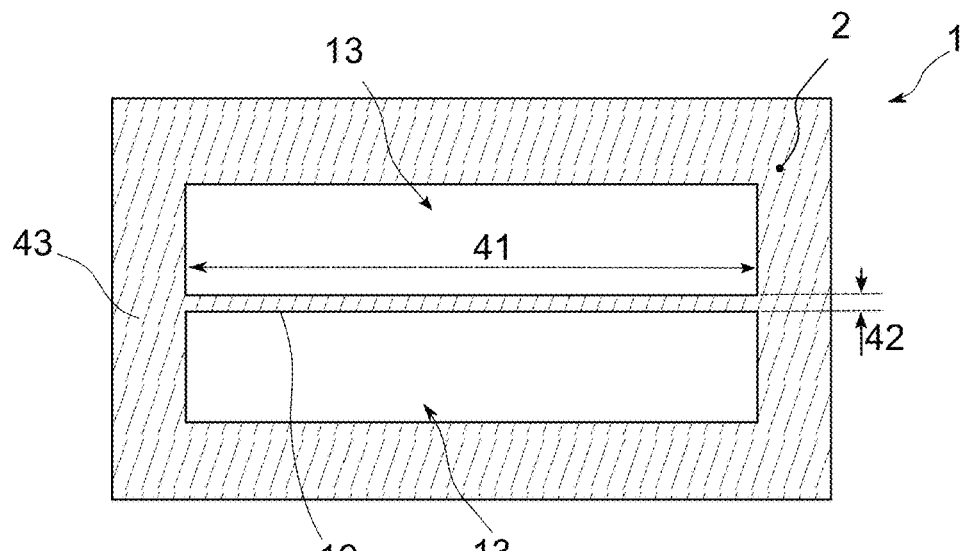
FIG. 15 illustrates a glass element with two openings separated by a web, in plan view of a side face.

A particular aspect of the invention when the process is used for separating off parts, in particular detaching inner parts and thus producing openings 13, is that very thin webs are produced as glass structures by two edges which run close to one another and have the inventive structure being introduced. FIG. 15 shows an example of this.

An embodiment of the invention therefore provides a plate-like glass element 1 which has a thickness in the range from 30 microns to 3 millimetres and has two opposite side faces 2, 3, wherein the contour of the glass element 1 comprises an elongated web 40 whose length 41 is at least five times, for example at least ten times, greater than its width, with length and width in each case being measured in a direction along a side face, and the edges 10 of the web 40 running next to one another each having a plurality of adjoining, rounded, substantially hemispherical depressions 7. The web 40 may be produced by separating off parts at the edges 40, using the above-described process in which the channels 5 are widened until they go over into one another and then flattened further as a result of etching, so that these may no longer be discernible as parallel structures perpendicular to the longitudinal direction of the edge 10. However, it is also possible to produce webs 40 having edges 10 as are shown in FIG. 4, FIG. 5 or FIG. 6.

The abovementioned aspect ratio of web length to web width reflects the fact that the webs 40 are elements having a highly filigree structure. As an alternative or in addition, the web width 42 of such a web 40 can be not more than four times the thickness of the glass element 1, for example not more than twice the thickness of the glass element 1. In one embodiment of the invention, the web width can even be smaller than the thickness of the glass element 1.

Regardless of the ratio of the width to the glass thickness of the aspect ratio, webs having a width of 400 μm or less, for example not more than 200 μm, or even 100 μm or less, can also be produced according to the invention.

Figure 16:
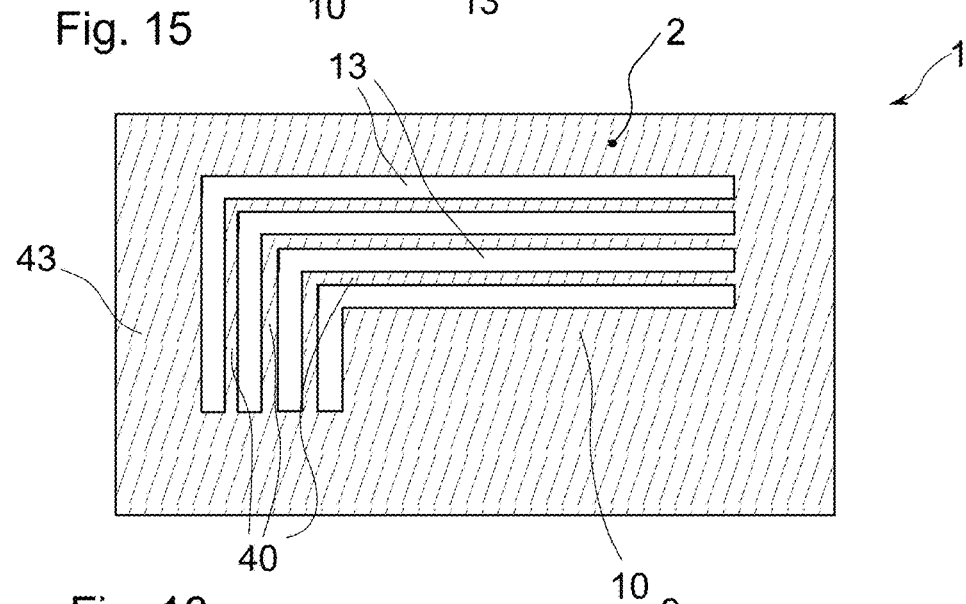
FIG. 16 illustrates another embodiment having a plurality of webs running parallel to one another.

The example shown in FIG. 15 is an embodiment of the invention in which a web 40 separates two openings 13 in the glass element 1. This is another use of the invention, since it is associated with the removal of inner parts to produce the openings 13, which in view of the sensitive remaining thin web 40 would be difficult to achieve or not be able to be achieved at all by way other processes. In addition, comparatively fracture-resistant edges 10 which stabilize the web 40 are at the same time produced by way of the process owing to the substantially hemispherical structuring. The glass element 1 of course does not consist only of the web 40, but instead the web 40 is joined to a basis 43 in the form of a section of the glass element 1 having a greater width. However, basis 43 and web 40 form only different sections of a one-piece glass element 1. In other words, the glass element 1 is a monolithic or one-piece part comprising the basis 43 and the web. In the example shown in FIG. 15, the basis 43 is in the form of a frame and the web 40 is joined at both ends to the frame-like basis 43. FIG. 16 shows a variant of the embodiment depicted in FIG. 15. In this variant, a plurality of webs 40 which run next to one another and at both ends go over into the likewise frame-like basis 43 are provided. As can be seen from this example, the webs 40 do not necessarily have to run in a straight line. The length of the web 40 is in such a case given by the respective curve length. Regardless of whether thin webs 40 are or are not defined between the openings 13, the transverse dimension of openings 13, as can be produced by the above-described process and whose edge 10 has substantially hemispherical depressions 7, for example at least 200 µm, for example at least 300 µm. For example, a glass element 1 having a plurality of circular openings 13 which are distributed over the glass element and have a diameter of at least 200 µm or more can be produced for various applications.

Figure 17:
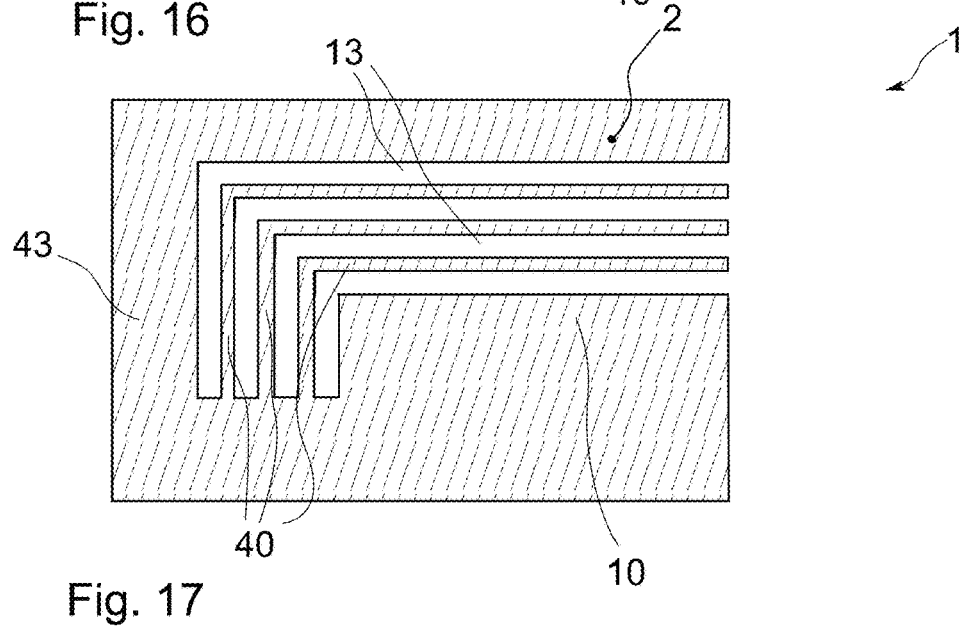
FIG. 17 illustrates another embodiment with webs which are free at one end.

FIG. 17 shows still another variant. In this variant, the webs 40 go over into the basis 43 on only one side, so that the webs 40 have one free end.

Figure 18:
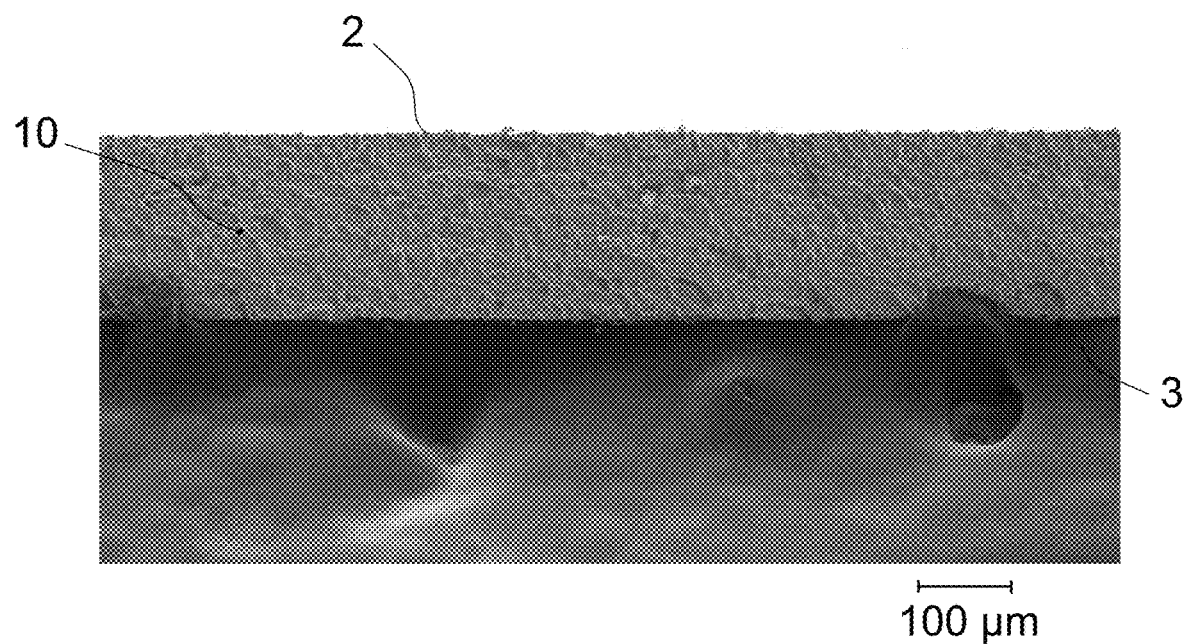
FIG. 18 and FIG. 19 are electron micrographs of an edge of a glass element in different enlargements.
Figure 19:
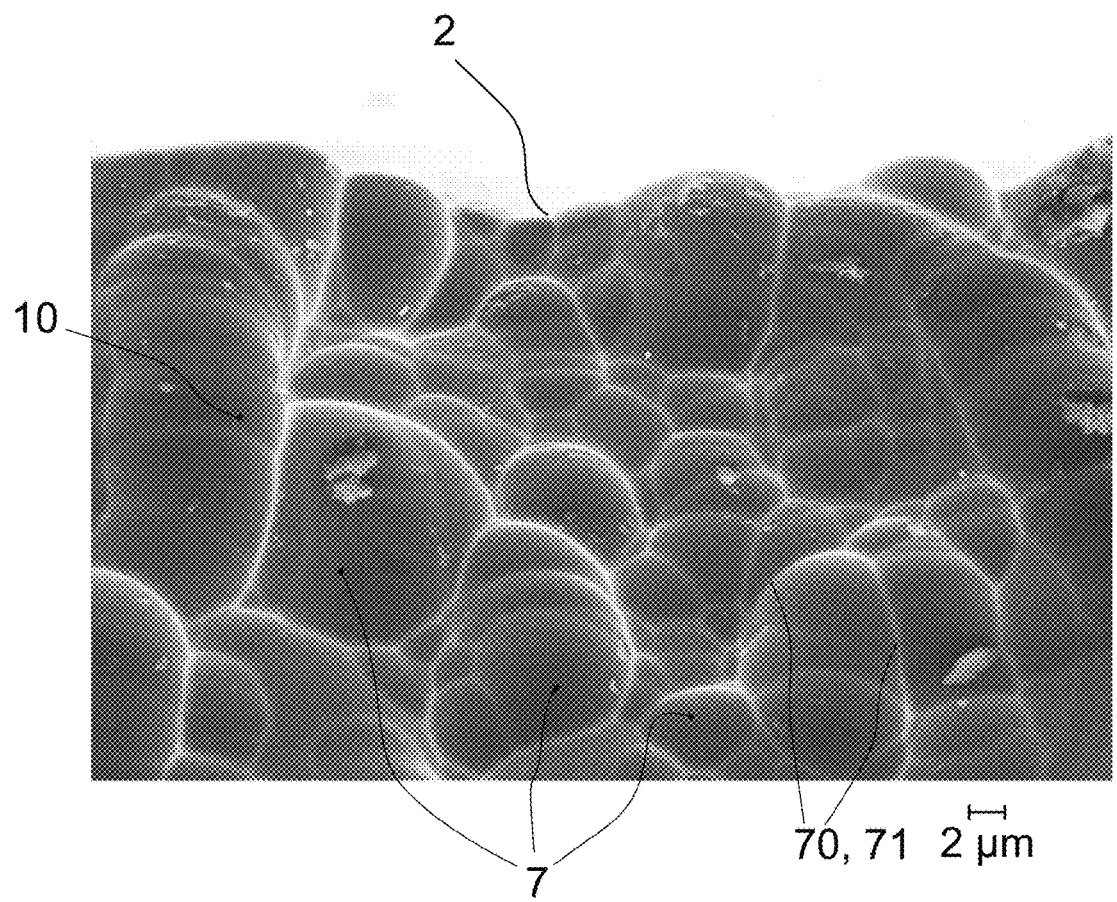

FIG. 18 and FIG. 19 show two further electron micrographs of the edge 10 of a glass element 1. Here, FIG. 18 shows the edge 10 over the full width of the glass element 1. FIG. 19 shows the edge 10 in a greater enlargement at the transition to one of the side faces 2. The edge 10 was produced as described above by the channels 5 being widened during etching to such an extent that they join and form a continuous edge, so that a part can be detached from the glass element 1. The channels 5 have been flattened during the course of etching, so that an essentially flat edge 10 which has a plurality of adjoining, rounded, substantially hemispherical depressions 7 is obtained. As can be seen from FIG. 19, the depressions 7 are here too separated by ridges 70 which form approximately polygonal delimiting lines 71. It is particularly conspicuous in the micrograph of FIG. 18 that the edge 10 runs in a straight line perpendicular to the side faces 2, 3 and also essentially perpendicular to the side faces. Likewise, the transition from the edge 10 to the side faces 2, 3 is virtually not rounded. The perpendicular course corresponds to the large angle of taper of the channels 5 of the embodiment shown in FIG. 6. The shape of this edge 10, as is also suitable for the webs 40 or for internal contours or as delimitation of openings 13, can be characterized by way of the abovementioned properties as follows: the inclination or the angle formed by the edge area with the adjoining side face 2, 3, is at least 85° in the half of the edge area adjoining the side face. Thus, the edge area 10 runs essentially at right angles to the side faces 2, 3, with a deviation of not more than 5° from a right angle.

As can also be seen in the example of FIG. 19, the transition region in which the inclination of the edge 10 goes over into the adjoining side face 2 is narrow and of the order of magnitude of the dimension of the substantially hemispherical depressions 3. In one embodiment, the average edge radius at the transition from the side face 2, 3 to the edge 10 orientated essentially perpendicularly to the side face 2, 3 is therefore not more than 10 microns.

The edges 10 produced according to the invention are generally characterized, due to the substantially hemispherical depressions 7, by high strength and favourable statistical parameters, especially a high Weibull modulus. This can be advantageous in the case of fragile elements having edges such as the webs 40 shown in FIG. 15 to FIG. 17. In general, without being restricted to the examples presented, edges 10 produced according to the invention with substantially hemispherical depressions 7 can have an average fracture strength of at least 200 MPa or even at least 300 MPa. This value is the tensile stress which occurs at the transition from the edge 10 to the side face under flexural stress and at which on average a fracture occurs. The Weibull modulus of the Weibull distribution of the tensile stress values for a fracture test and fractures extending from the edge 10 can, according to an alternative or additional embodiment, have a value of at least 5.5. These values apply both to the edges 10 having still visible channels 5, i.e. as per the examples of FIG. 4 to FIG. 7, and to edges 10 which have, as shown in FIGS. 18 and 19, no discernible channels 5.

Due to high stability and strength of the edges produced according to the invention, the invention is suitable for complex and fragile structures which are not producible by using other processes. Thereto belong also non-symmetrical structures with thin and/or long webs. However, at the same time, it was also ascertained that the stability of the products considerably depends on the geometry. In more detail, it was ascertained that it is more favourable to comply with a certain geometric specification, in case of a structure which is held in openings in the glass element, by one or more webs. A sufficient stability and manageability is ensured by this specification. Particularly, a glass element is provided for that purpose which has at least two openings 13 such that a structure having at least one web 40 is formed between the openings 13. In doing so, a parameter G may be assigned to the structure that is given by the relation $$G = \frac{l_1^2}{l_2 \cdot b \cdot \sqrt[3]{h} \cdot N}$$

In doing so, glass elements according to the invention may still be realized with well mechanic stability, if the parameter G is at least 10 mm$^{-1/3}$, for example at least 50 mm$^{-1/3}$, for example 100 mm$^{-1/3}$. Vice versa, it is sufficient, if the parameter is at most 400 mm$^{-1/3}$, for example at most 300 mm$^{-1/3}$, for example at most 200 mm$^{-1/3}$.

The variable h in the above relation denotes the thickness of the glass element 1.

Figure 20:
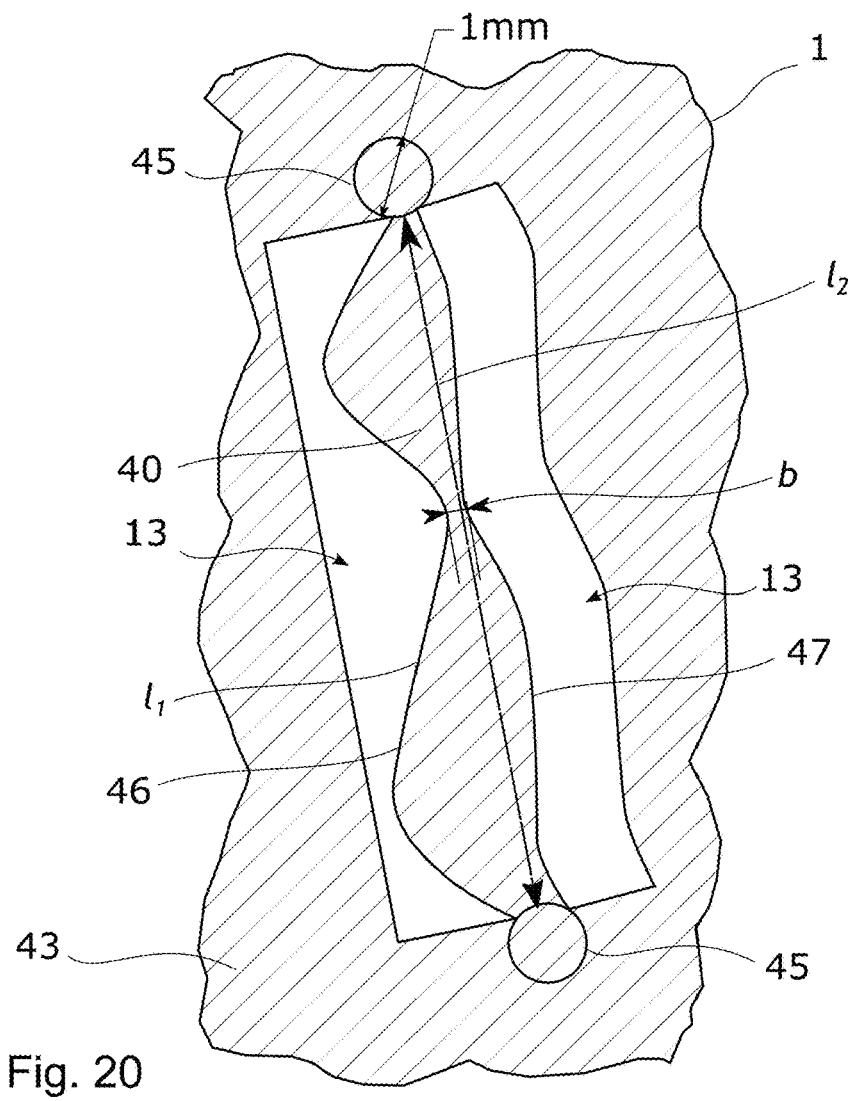
FIG. 20 illustrates a glass element with a web.

For clarifying the parameters of the relation, FIG. 20 shows a glass element 1 having a simple structure that, in this case, only comprises one web 40 extending between two openings 13.

In the above relation, $l_1$ denotes the longest edge length between two adjacent contact points or contact regions 45 positioned along the edge of the structure, of one or two different webs 40 with the glass element 1. Therefore, this quantity denotes the arc length of the longest edge between two adjacent contact regions 45. The edges 46, 47 of the web 40 may, as also shown by the example of FIG. 20, have different lengths, depending on forming. In case of the shown example, the edge 46 has a greater length than the edge 47. The parameter l1 here therefore is the arc length of that edge 46. The contact regions 45 are the transition regions of the glass, at which regions the web 40 goes over into the glass surrounding the openings 13, or into the base 43, respectively. In that context, a contact region 45 is defined as circular region having a diameter of 1 mm, the circular region positioned at the web 40 such that its border touches both edges of the web 40, therefore also the edges of both openings 13. In doing so, the position of the imaginary contact region 45 may be determined for calculating the parameter G, by shifting the circular region from the base 43 towards the web 40. The position is achieved, if the region just totally fits onto the glass, and its border touches the edges of the openings. As a result, this relation and the geometry according to the invention applies for webs having a minimal length of less than 1 mm.

The length $l_2$ denotes the shortest straight-line distance of two contact regions 45 at the ends of the web 40. The edge-to-edge distance of the circular contact region 45 is significant for both lengths $l_1$ and $l_2$. In case of more than two contact regions 45, the paths of the lengths $l_1$ and $l_2$ do not necessarily continue between the same contact regions 45. The double arrow delineated in FIG. 20 for denoting the length $l_2$ accordingly ends at the edges of the contact region 45.

The parameter b finally denotes the smallest distance of the openings 13 from each other, along the web 40, or, with other words, the minimal web width.

Such a geometry, as afore-said described, is, with respect to strength and manageability especially advantageous in connection with the forming of the edge, according to the invention, therefore with hemispherical deepenings. Such a geometry may nevertheless be used with differently formed edges.

In case of the shown example, only one single web 40 is present. But also a plurality of structures is possible which may be carried by more than one web. In that context, it is important that, in that case, the paths $l_1$ and $l_2$ may continue between different contact regions 45. For evaluating the stability of a design, G therefore relates the longest possible distance between two contact regions $l_1$ to the shortest possible connection $l_2$ of two contact points. N≥2 principally applies for the number N of contact regions.

Figure 21:
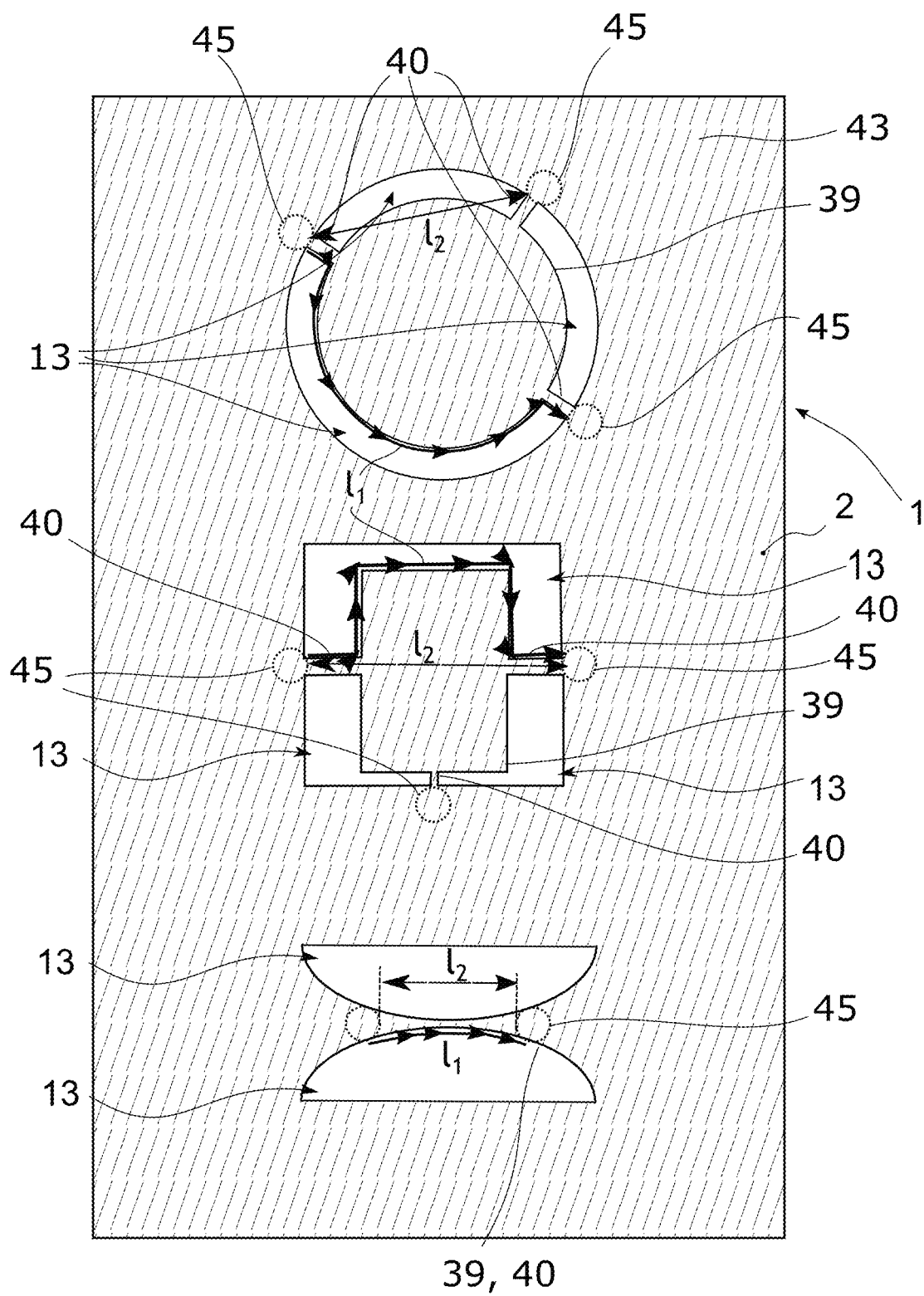
FIG. 21 illustrates a glass element with several structures connected by webs.

For the sake of further illustration, FIG. 21 shows a glass element with three different structures 39. The upper structure 39 is circular and held at three webs 40. The structure 39 in the mid of the glass element 1 is also held at three webs 40, but has a rectangular form. The lowermost structure 39 consists, similarly to the example of FIG. 20, only of a single web 40. This web, however, narrows towards the mid. In doing so, the web width clearly narrows from a width of more than 1 mm to a web width less than 1 mm, in the mid. Accordingly, also the contact regions 45 are on the web 40, for calculating the parameter G, namely such that their border touch the edges of the web at the place, at which the distance of the edges falls below 1 mm.

By way of the two upper structures 39, it may be seen that the distance $l_2$ and the arc length $l_1$ between the contact regions 45 may be calculated at different webs. The longest edge length $l_1$ between two adjacent contact points positioned along the edge of the structure is relevant for the parameter G. This is each delineated for both structures 39. In case of the example of the upper-most, circular structure 39, in particular a shortest distance $l_2$ between two contact regions 45 and a longest edge length between two other, adjacent contact regions 45.

In one embodiment of the invention, not depending on the morphology of the edges, a plate-like glass element having a thickness in the range from 30 micrometres to 3 millimetres and two side faces 2, 3 facing each other is accordingly provided, wherein at least two openings 13 are inserted in the glass element 1 such that the region of the glass element 1 between the openings forms a structure 39 with at least one web 40 whose minimal width is less than 1 mm, wherein a parameter G is defined for the structure, G given by the above-mentioned relation, wherein the parameter G has a value of at least 10 mm$^{-1/3}$ and of at most 400 mm$^{-1/3}$, wherein $l_1$ is the longest edge length between two contact regions 45 being adjacent along the edge of one of the openings 13, and $l_2$ is the length of the shortest possible straight-line connection between two contact regions 45, and wherein a contact region 45 of a web 40 is each defined as a circular region of the glass element 1, having a diameter of 1 mm, the circular region arranged at the web 40 such that its border each touches the borders of both openings 13 at at least one point, the intermediate range of the openings forming the web 40, and wherein b denotes the minimal web width, h the thickness of the glass element 1 and N the number of the contact regions 45. Webs having a minimal width of not less than 300 μm can be used, for this embodiment.

Also in case of the above-described geometry of a glass element with one or more webs, fractures at the web may easily occur during production.

It was furthermore ascertained that, when producing such products, rejects due to web fracture occur, to an increased degree. This risk particularly exists with glass element whose openings are clearly larger than the remaining webs.

Figure 22:
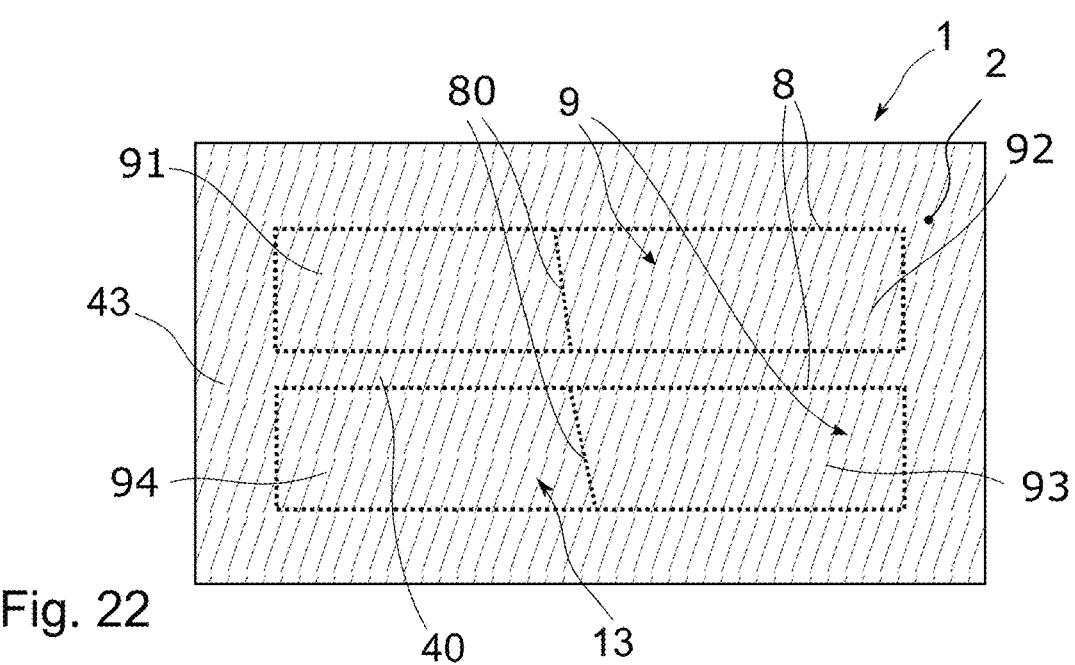
FIG. 22 illustrates a glass element which is prepared for detaching inner parts.

When detaching the inner parts, the webs may twist in the glass element and take damage, in doing so. This may be avoided by generally, additionally to the closed separation line, inserting auxiliary intersections, or auxiliary lines, respectively, made of adjacent, filament-shaped damages which divide an inner part limited by the closed separation line into smaller segments. In doing so, it was ascertained that can be advantageous, if an inner part is at least bisected, e.g. quartered, by way of an auxiliary intersection. FIG. 22 shows, as an example, a glass element 1 before detaching inner parts 9. The glass element 1 is prepared with two closed separation lines 8 made of adjacent channels, wherein the later web 40 continues between the sections of the separation lines 8, facing each other. An auxiliary line 80 is inserted, additionally to each separation line, the auxiliary line dividing the inner parts 8 into two segments 91, 92, and 93, 94, each. It is apparent to the skilled person that, if needed, also further auxiliary lines may be inserted. Furthermore, the separation line 8 and the auxiliary line may be inserted in one single step, for example by guiding the laser beam in an eight-shaped line.

In a refinement, the auxiliary lines are selected with regard to course and number such that the inner part 9 is divided into segments of the maximally 20-fold size, for example the maximally 10-fold size, for example the maximally two-fold size of a web between two inner parts 9. In doing so, the size ratio is determined by the ratio of minimal web width to maximal diagonal of a segment. Accordingly, the maximally long diagonal of a segment is therefore 20-times, for example 10-times, for example two-times longer than the minimal web width.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within

| List of reference numerals | |
|---|---|
| Plate-like glass element | 1 |
| Side faces | 2, 3 |
| Channel | 5 |
| Opening of 5 in 2, 3 | 6 |
| Substantially hemispherical depression | 7 |
| Separation line | 8 |
| Inner part | 9 |
| Edge of 1 | 10 |
| Flat edge section | 11 |
| Opening in 1 | 13 |
| Computer | 15 |
| Positioning device | 17 |
| Apparatus for laser processing | 20 |
| Focusing optics | 23 |
| Laser beam | 27 |
| Ultrashort pulse laser | 30 |
| Filament-shaped flaw | 32 |
| Polymer layer | 35 |
| Opening in 35 | 36 |
| Structure held by web | 39 |
| Web | 40 |
| Length of 40 | 41 |
| Width of 40 | 42 |
| Basis | 43 |
| Contact region of 40 | 45 |
| Edges of 40 | 46, 47 |
| Wall of 5 | 54 |
| Longitudinal direction of 5 | 51 |
| Ridge between channels 5 | 52 |
| Ridge | 70 |
| Polygonal delimiting line | 71 |
| Point of impingement | 73 |
| Corners of 71 | 72 |
| Auxiliary line | 80 |
| Segments of 9 | 91-94 |

What is claimed is:

1. A method for producing a plate-like glass element, comprising the steps of:
   providing the plate-like glass element having a pair of side faces and an ultrashort pulse laser having a laser beam and focusing optics;
   directing the laser beam of the ultrashort pulse laser onto one of said side faces of said glass element;
   concentrating the laser beam by said focusing optics to form an elongated focus in the glass element;
   producing at least one filament-shaped flaw in a volume of the glass element by a radiated-in energy of the laser beam, a longitudinal direction of which runs transverse to said one side face of said side faces, and the ultrashort pulse laser radiates in a pulse or a pulse packet having at least two successive laser pulses to produce said at least one filament-shaped flaw, and, after introduction of said at least one filament-shaped flaw;
   widening said at least one filament-shaped flaw to form at least one channel by exposing said glass element to an etching process which includes an etching medium which removes a glass of the glass element at a removal rate of less than 8 µm per hour; wherein the plate-like glass element is provided having a thickness in the range from 30 micrometres to 3 millimetres, wherein at least two openings are inserted into the glass element such that a region of the glass element between the openings forms a structure with at least one web whose minimal width is less than 1 mm, wherein a parameter G is defined for the structure, and G is defined by:

$$G = \frac{l_1^2}{l_2 \cdot b \cdot \sqrt[3]{h} \cdot N}$$

wherein the parameter G has a value of at least 10 mm$^{-1/3}$ and of at most 400 mm$^{-1/3}$, wherein $l_1$ is a longest edge length between a pair of contact regions being adjacent along an edge of one of said openings, and $l_2$ is a length of a shortest possible straight-line connection between said pair of contact regions, and wherein each said contact region of a respective web is each defined as a circular region of the glass element, having a diameter of 1 mm, and said circular region is arranged at said at least one web such that each border of said circular region touches corresponding borders of both of said openings on at least one point, an intermediate range between said openings forming said at least one web, and wherein b denotes a minimal web width, h denotes a thickness of the glass element, and N is a number of said contact regions.

2. The method of claim 1, wherein a point of impingement of the laser beam on the glass element is conducted along a prescribed path, and a plurality of filament-shaped flaws located next to one another on the path are introduced into the glass element, and a plurality of channels located next to one another are subsequently introduced by the etching process into the glass element, and the glass element is then parted along the prescribed path so as to form an edge having said channels that are open at the sides and wherein, in case the prescribed path forms an internal edge, an opening is formed.

3. The method of claim 2, wherein a diameter of said channels of said plurality of channels is increased by the etching process until the glass between the said plurality of channels is removed and said plurality of channels join.

4. The method of claim 2, wherein a closed separation line and at least one auxiliary line made of at least one adjacent filament-shaped damage is inserted which divide an inner part limited by the closed separation line into a plurality of smaller segments which are limited by said at least one auxiliary line and the closed separation line.

5. The method of claim 1, wherein at least one side face of said side faces of the glass element is provided with a polymer layer before irradiation with the laser beam, which polymer layer is removed locally on introduction of the laser beam but remains at regions which surround a point of impingement of the laser beam and protects these regions during the subsequent etching process.

6. The method according to claim 1, wherein a plate-like glass element with a silicate glass is provided having a content of alkali metal oxides of less than 17 percent by weight such that the silicate glass has a basicity in the range from 0.45 to 0.55.

7. The method according to claim 2, wherein the opening is produced in said plate-like glass element, the opening having an edge with substantially hemispherical depressions, and a transverse dimension of at least 200 µm.

* * * * *